J. G. MALABY.
MOSQUITO BAR FRAME.
APPLICATION FILED AUG. 21, 1907.
927,738.
Patented July 13, 1909.
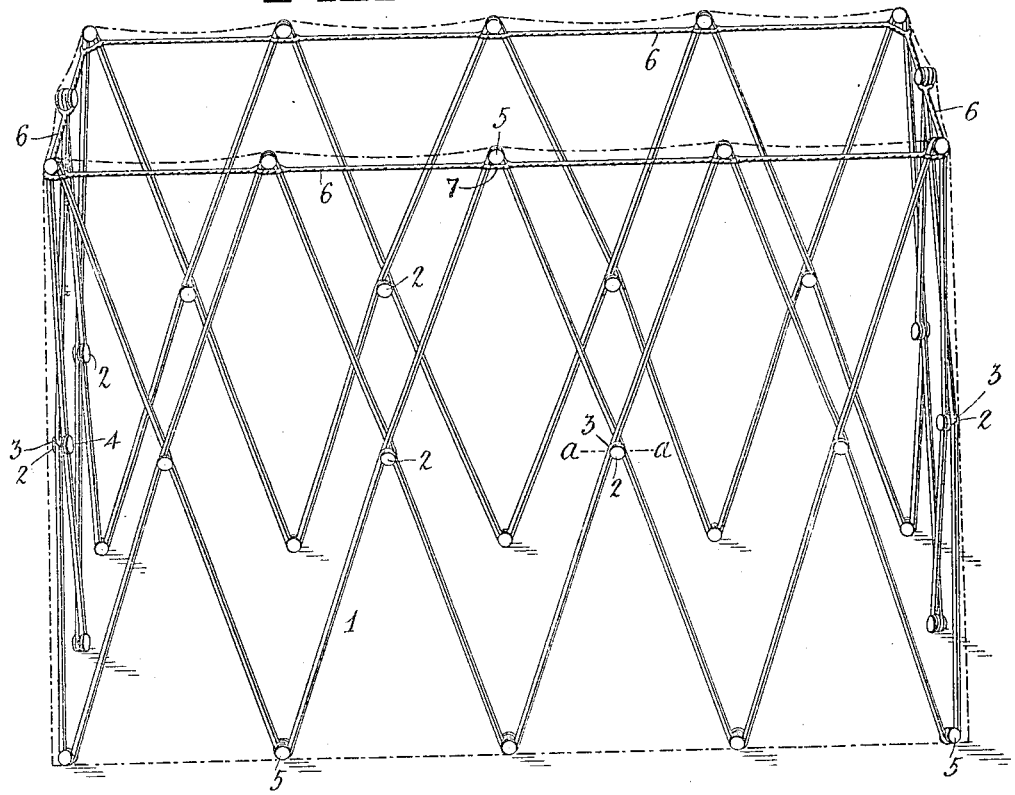
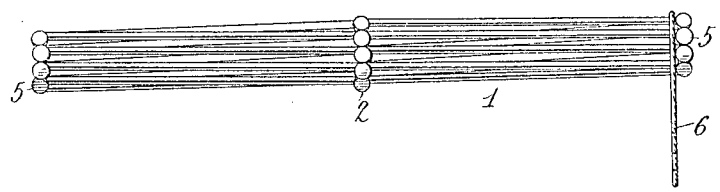
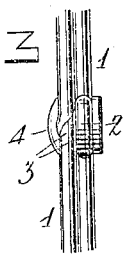
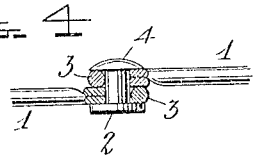
Witnesses
Inventor
John G. Malaby
By Victor J. Evans
Attorney

UNITED STATES PATENT OFFICE.

JOHN G. MALABY, OF FOREMAN, ARKANSAS.

MOSQUITO-BAR FRAME.

No. 927,738.  Specification of Letters Patent.  Patented July 13, 1909.

Application filed August 21, 1907. Serial No. 389,531.

*To all whom it may concern:*

Be it known that I, JOHN G. MALABY, a citizen of the United States of America, residing at Foreman, in the county of Little River and State of Arkansas, have invented new and useful Improvements in Mosquito-Bar Frames, of which the following is a specification.

This invention is an improved foldable mosquito bar frame adapted for use for supporting the mosquito netting above and around a bed, crib or the like, and which when the same is not in use may be readily folded into very small compass to enable the same to be readily taken from place to place, and the said invention consists in the construction, combination and arrangement of devices hereinafter described and claimed.

In the accompanying drawing,—Figure 1 is a perspective view of a mosquito bar frame constructed in accordance with this invention, showing the same set up and extended in position to support the mosquito netting, the outlines of the mosquito netting being indicated in dotted lines. Fig. 2 is an elevation of my improved mosquito bar frame, showing the same compactly folded. Fig. 3 is a detail elevation of one of the pivot joints, whereby the rods which constitute the frame are flexibly joined together. Fig. 4 is a detail sectional view of one of the joints taken on the plane indicated by the line *a—a* of Fig. 1.

The sides and ends of my improved mosquito bar frame are formed of rods 1 which are preferably made of wire, but may be made of any other suitable material and are of suitable size. The said rods are arranged in pairs, each pair being connected together at a point intermediate their ends by a flexible joint 2, here shown as a pivot joint, eyes 3 being formed in said rods and rivets, or other suitable pivots 4, being inserted in and connecting the said eyes. Each pair of crossed pivotally connected rods 1 are connected at their ends to the next adjacent rods by flexible joints 5, which are here shown as pivot joints and which in the present embodiment of my invention are identical in construction with the joints 2.

The pairs of crossed pivotally connected rods are so arranged as to form the sides and ends of the frame, and the upper ends of the said rods are connected together by a cord 6, which cord extends around the sides and ends of the frame, and when the latter is set up, as shown in Fig. 1, so as to be disposed around a bed, crib, or the like, the said cord coacts with the pivotally connected upper ends of the flexibly jointed crossed rods to support the mosquito netting bar over and around such bed, crib, or the like. Furthermore, the said cord limits the extent to which the said rods may move angularly when partially open to form the sides and ends of the frame and hence serves to hold such rods in set-up position. The cord is secured to the upper pivotal ends of the rods by providing it with loops 7 which engage the rods below the upper pivot pins or rivets. These loops, and hence the cord, are held from downward displacement by the diverging relation of the rods and from upward displacement by the heads of the rivets. The cord is thus securely applied in position without the necessity of employing auxiliary fasteners. Said crossed pivotally connected rods may be readily folded in parallel relation to dispose the mosquito netting frame compactly, as shown in Fig. 2, so that such frame is rendered exceedingly portable and is enabled to be readily carried from place to place and to be easily stored in a very small space when the same is not in use.

It will be understood that a mosquito bar frame constructed in accordance with my invention is exceedingly light, cheap, simple, strong and durable, and that the same may be readily manufactured.

Having thus described the invention, what is claimed as new, is:—

A folding or collapsible mosquito bar support comprising a rectangular frame open at top and bottom and embodying side and end walls, each of said walls consisting of a plurality of pairs of rods, the rods of each pair extending continuously from bottom to top of the wall and being crossed and pivoted intermediate of their lengths and pivotally connected at their upper and lower ends to the upper and lower ends of the rods of adjacent pairs, the pivotal connections between the rods comprising eyes formed on said rods and double-headed rivets passing through said eyes, forming diamond-shaped collapsible frame sections around the frame, the walls having their frame sections pivotally connected at the corners of the frame to adapt the end walls to fold transversely and the side walls to fold longitudinally, and a cord extending around the upper edges of the side and end walls of the frame and flexibly connecting the upper pivotally connected ends of the rods, said cord having loops engaging the upper pivoted ends of the rods below their connecting rivets and held from downward displacement by the diverging relation of the rods and from upward displacement by the heads of the rivets.

In testimony whereof I affix my signature in presence of two witnesses.

JOHN G. MALABY.

Witnesses:
J. S. DOLLARLIEDE,
J. W. LAYNE.